United States Patent
Martin

(10) Patent No.: US 12,518,178 B2
(45) Date of Patent: Jan. 6, 2026

(54) METHOD FOR PREDICTING A REMAINING LIFETIME PARAMETER OF A COMPONENT

(71) Applicant: Liebherr-Components Colmar SAS, Colmar (FR)

(72) Inventor: Mikael Martin, Bergheim (FR)

(73) Assignee: LIEBHERR-COMPONENTS COLMAR SAS, Colmar (FR)

( * ) Notice: Subject to any disclaimer, the term of this patent is extended or adjusted under 35 U.S.C. 154(b) by 821 days.

(21) Appl. No.: 17/658,216

(22) Filed: Apr. 6, 2022

(65) Prior Publication Data

US 2022/0327396 A1  Oct. 13, 2022

(30) Foreign Application Priority Data

Apr. 7, 2021 (DE) .................. 10 2021 108 560.8

(51) Int. Cl.
  *G06N 5/022* (2023.01)
(52) U.S. Cl.
  CPC .................. *G06N 5/022* (2013.01)
(58) Field of Classification Search
  CPC .......... G06N 5/022; G05B 2219/32234; G05B 2219/37209; G05B 2219/37252; G05B 23/0221; G05B 23/0254; G05B 23/0283; G05B 19/4065; G06F 2119/04
  See application file for complete search history.

(56) References Cited

U.S. PATENT DOCUMENTS

| 8,626,456 B2 | 1/2014 | Moore et al. |
| 10,262,270 B2 | 4/2019 | Kung et al. |
| 11,520,324 B2 * | 12/2022 | Szasz ................. G05B 23/0283 |
| 2016/0046503 A1 | 2/2016 | Hoek et al. |
| 2017/0320004 A1 | 11/2017 | Allegorico et al. |
| 2018/0165592 A1 | 6/2018 | Huang et al. |
| 2018/0272491 A1 | 9/2018 | Yang et al. |

FOREIGN PATENT DOCUMENTS

| DE | 102016014915 A1 | 6/2017 |
| DE | 102017223639 B3 | 4/2019 |
| DE | 102019003601 A1 | 12/2019 |
| EP | 1724717 A2 * | 11/2006 | ............. G05B 17/02 |
| WO | 2016087302 A1 | 6/2016 |

OTHER PUBLICATIONS

European Patent Office, Extended European Search Report Issued in Application No. 22163238.3, Nov. 3, 2022, Germany, 15 pages.

* cited by examiner

*Primary Examiner* — Mi'schita' Henson
(74) *Attorney, Agent, or Firm* — McCoy Russell LLP

(57) ABSTRACT

A method for predicting a remaining lifetime parameter of a component installed in a system in particular of an engine component and/or a filter. The method includes, in one example, repeatedly sensing at least one parameter of the system to obtain a history of data values, fitting an aging pattern to the data values, and determining a remaining lifetime parameter of the component from the aging pattern, wherein at least some data values are erased with time such that the fitting is based on a subset of the data values determined since an initialization of the algorithm, wherein data values from an initial phase are not erased but retained as anchor values for the fitting throughout the lifetime determination of the component.

18 Claims, 3 Drawing Sheets

METHOD FOR PREDICTING A REMAINING LIFETIME PARAMETER OF A COMPONENT

CROSS-REFERENCE TO RELATED APPLICATION

The present application claims priority to German Patent Application No. 10 2021 108 560.8 filed on Apr. 7, 2021. The entire contents of the above-listed application is hereby incorporated by reference for all purposes.

TECHNICAL FIELD

All manufactured systems or subsystems have their own lifetime. For some reasons, the real lifetime may differ upwards or downwards from the targeted one.

BACKGROUND AND SUMMARY

The present disclosure is therefore directed to a method for predicting a remaining lifetime parameter of a component.

Such a prediction may lead to the following significant benefits:
1. avoid catastrophic component failure which would impact the integrity of the whole system or cause damages to people around,
2. avoid unplanned maintenance due to unexpected component failure,
3. forecast parts procurement and arrange delivery on time if failure is sufficiently early detected, and
4. increase component lifetime depending on how the system actually ages.

To prevent unexpected failures or malfunction before the targeted lifetime, some additional devices are usually used to send an alarm to the user indicating that the components have to be replaced. As an example, such monitoring devices could be a pressure switch or a sensor to detect an overpressure for pressurized fluid flowing through a component. It could be a temperature sensor to detect an abnormal change or over range of temperature.

Other methods exist in the literature:

Document U.S. Pat. No. 8,626,456 B2 proposes a method to predict the remaining useful life of an air filter by measuring the air mass flow and the pressure downstream the air filter. The measured point (pressure, mass flow) is compared to a known curve expressing the pressure differential across an end of life and new air filter function of air mass flow. The result is in the form of a percentage of the filter capacity (not a remaining time). It also requires knowing the behavior of a new and end-of-life filter.

Document WO 2016087302 A1 shows a method to predict the residual useful life of an air filter. The remaining lifetime is determined on a trajectory based similarity prediction algorithm. Meaning that different predetermined reference degradation curves are known and implemented in the algorithm. A similarity parameter is calculated from the comparison between similarity curves and the actual one.

Document DE 102017223639 B3 proposes a method to detect a plugged air filter on an engine. It requires a specific air circuit to bypass the engine and an electric turbocharger to indicate the degree of soiling in the air filter. Authors propose to pressurise the circuit between engine and air filter using the electric turbocharger and depending on the time to make the pressure, they are able to know the state of the filter.

The object of the present disclosure is to provide an improved method for predicting a remaining lifetime parameter of a component and a corresponding system.

In a most general aspect, the method of the present disclosure, which predicts the remaining lifetime of a component, is mainly based on an ageing pattern combined to a numerical method. The idea is to regularly sense the system where the component is installed and to save in memory the measurement history or part of it. Then, the measured value(s) feed(s) the numerical method which fits the measured point(s) to the ageing pattern. From this, the remaining lifetime of the component can be deduced.

In a first independent aspect, the present disclosure comprises a method for predicting a remaining lifetime parameter of a component installed in a system, the method comprising:
repeatedly sensing at least one parameter of the system to obtain a history of data values;
fitting an aging pattern to the data values; and
determining a remaining lifetime parameter of the component from the aging pattern,
wherein at least some data values are erased with time such that the fitting is based on a subset of the data values determined since an initialization of the algorithm, wherein first data values from an initial phase are not erased but retained as anchor values for the fitting throughout the lifetime determination of the component.

The erasing of data saves storage space, and simplifies the fitting procedure. The inventors of the present disclosure have realized that retaining the first data values will allow to erase other, more recent data while maintaining a high accuracy of the lifetime prediction.

In an embodiment of the present disclosure, in addition to the anchor values, second data values from a most recent time period and/or third data values from at least one intermediate period are used in the fitting.

The second data values allow to finely register the latest changes regarding the state of the component. The third data values will improve the fit as they define the general shape of the aging pattern.

In an embodiment of the present disclosure, the second data values and/or the third data values may be regularly replaced by new data values.

In an embodiment of the present disclosure, the second data values and/or the third data values are stored by separate processes and/or in separate memory sections. In an embodiment, there may be a fixed number of second data values and/or third data values, which are regularly updated.

In an embodiment of the present disclosure, the second data values and/or the third data values are each saved and erased on a first in first out basis.

In an embodiment of the present disclosure, some of the second data from a most recent time period may be saved as third data once they are erased as second data.

In an embodiment of the present disclosure, the first data values from an initial phase and/or the second data values from a most recent time period are sampled and/or saved at a higher frequency than third data values from at least one intermediate period.

In an embodiment of the present disclosure, the first data are only erased when the algorithm is re-initialized. In an embodiment of the present disclosure, all data are erased when the algorithm is re-initialized.

In a second independent aspect, the present disclosure comprises a method for predicting a remaining lifetime parameter of a component installed in a system, the method comprising:

repeatedly sensing at least one parameter of the system to obtain a history of data values;

fitting an aging pattern to the data values; and determining a remaining lifetime parameter of the component from the aging pattern, wherein the aging pattern for determining the remaining lifetime parameter is automatically selected from a predefined set of different aging patterns.

Therefore, the method may be used with components having different aging patterns and automatically adapts to the aging pattern of a component.

The selection may be performed on the basis of the data values that are used for fitting to the aging pattern and in particular on the basis of the fitting procedure.

In an embodiment of the present disclosure, the method starts with a default aging pattern and/or automatically switches to a different aging pattern if the current aging pattern does not fulfill a quality criterion, in particular if it does not provide a fit to the data values with a predefined accuracy.

In an embodiment of the present disclosure, the aging pattern is selected during an initialization phase of the method and then retained throughout the procedure.

In an embodiment of the present disclosure, the method may switch to a different aging pattern throughout the entire procedure.

In an embodiment of the present disclosure, the aging pattern is selected during an initialization phase of the method and/or retained as long as it fulfils the quality criterion.

In a third independent aspect, the present disclosure comprises a method for predicting a remaining lifetime parameter of a component installed in a system, the method comprising:

repeatedly sensing at least one parameter of the system to obtain a history of data values;

fitting an aging pattern to the data values; and determining a remaining lifetime parameter of the component from the aging pattern, wherein a change of the component is automatically detected by evaluating the data values.

Thereby, when the component is changed, it is not necessary to provide an input regarding the change to the method, greatly simplifying the operation. In particular, the change of the component may be a replacement of the component, in particular by a new component.

In an embodiment of the present disclosure, the change of the component is detected by monitoring a change in the data values, in particular a change of the data values with time, in particular a time derivate of the data values.

In an embodiment of the present disclosure, the method deduces that a new component has been installed if a change in the data values, in particular a time derivate of the data values, is above a threshold.

Alternatively or in addition, the method deduces that a new component has been installed if a change in the data values, in particular a time derivate of the data values, has an opposite sign with respect to the previous data history.

In particular, if the data values usually increase with time, a decrease of the data values, in particular a decrease that is bigger than a threshold, may indicate that the component has been exchanged.

In an embodiment of the present disclosure, the lifetime parameter determination is reset when a change in the component is detected. The reset may in particular comprise a re-initialization of the method.

In an embodiment of the present disclosure, the reset comprises removing data values that were obtained before the change of the component from evaluation and/or resetting parameters of the aging pattern.

In an embodiment of the present disclosure, the reset may in particular comprise resetting the algorithm to an initial state and/or default values.

In an embodiment of the present disclosure, the reset comprises an initialization phase where new first data are stored as anchor values.

The methods of the first, second and third aspect described above may be used independently from each other and each form the subject matter of the present application on their own.

Further, the first, second and/or third aspect may be combined with each other. Further, features described with respect to any of the aspects above may be combined with the most general aspect of the present disclosure.

In an embodiment of the present disclosure, the methods of the first and second aspect are combined.

In an embodiment of the present disclosure, the methods of the second and third aspect are combined.

In an embodiment of the present disclosure, the methods of the first and third aspect are combined.

In an embodiment of the present disclosure, the methods of the first, second and third aspect are combined.

Further features applicable to any one of the methods described above are described in the following:

In an embodiment of the present disclosure, at each point in time, the method only uses a single aging pattern for the fit and for the determination of the remaining lifetime parameter. Thereby, the computing effort can be reduced.

In an embodiment of the present disclosure, during an initialization period, the determined remaining lifetime parameter is not outputted to a user. During the initialization period, the prediction is still of low quality and may not yet have stabilized. During the initialization period, a default value may be output the user as the remaining lifetime parameter instead of the determined remaining lifetime parameter.

In an embodiment of the present disclosure, an end of the initialization period may be automatically determined by monitoring a change in the determined remaining lifetime parameter and in particular a gradient of the determined remaining lifetime parameter.

In particular, the method may monitor the remaining lifetime parameter and leave the initialization period once the remaining lifetime parameter has stabilized, for example once changes in the remaining lifetime parameter between a number of consecutive determinations are below a threshold.

In an embodiment of the present disclosure, the fitting of the data values to the aging pattern comprises determining at least one parameter of the aging pattern.

In an embodiment of the present disclosure, the aging pattern may be defined as a formula, wherein coefficients of the formula may be determined in the fitting procedure.

In an embodiment of the present disclosure, the fitting of the data values to the aging pattern comprises determining parameters of the aging pattern that minimize an error between the sensed data values and the values provided by the aging pattern.

In an embodiment of the present disclosure, the same fitting procedure is used throughout the entire lifetime determination procedure.

In an embodiment of the present disclosure, the remaining lifetime parameter of the component is determined from the aging pattern by comparing the aging pattern fitted to the data values with a parameter value threshold.

In particular, a parameter value threshold may be provided that indicates an end of life of the component. After fitting of the data values, the method may read from the aging pattern fitted to the data values when the parameter value threshold will be reached, and calculate the remaining lifetime parameter from the result.

In an embodiment of the present disclosure, the remaining lifetime parameter may be a remaining operating time, such as a remaining number of operating hours.

In an embodiment of the present disclosure, the aging pattern may describe the dependency of the parameter sensed by the system on the lifetime of the component. In particular, this dependency may be described by a mathematical formula having parameters that can be fitted to the sensed data values. The fitted aging pattern can then be used to extrapolate the future development of the sensed parameter.

In an embodiment of the present disclosure, the component is an engine component.

In an embodiment of the present disclosure, the component is a filter, in particular a filter used in an engine, such as an oil filter or an air filter.

In an embodiment of the present disclosure, the component is a filter and the parameter of the system sensed by the method is a pressure loss over the filter.

The present disclosure further comprises a system for predicting a remaining lifetime parameter of a component installed in a system, in particular of an engine component and/or a filter, the system comprising a controller configured and programmed to determine a remaining lifetime parameter of the component using any one of the methods described above.

The system may further comprise a sensor for sensing the parameter, such as a pressure sensor and/or a differential pressure sensor.

In an embodiment of the present disclosure, the system may be connected to a user interface and programmed to inform the user of a remaining lifetime of the component and/or output a servicing requirement of the component.

The controller may comprise a microprocessor and a non-volatile memory for storing a program, the program performing the method described above when running on the microprocessor. The controller may further comprise a memory for storing the data values indicated above.

BRIEF DESCRIPTION OF THE FIGURES

The present disclosure will now describe in more detail on the basis of the following figures and embodiments.

The figures show.

DETAILED DESCRIPTION

Figure 1:
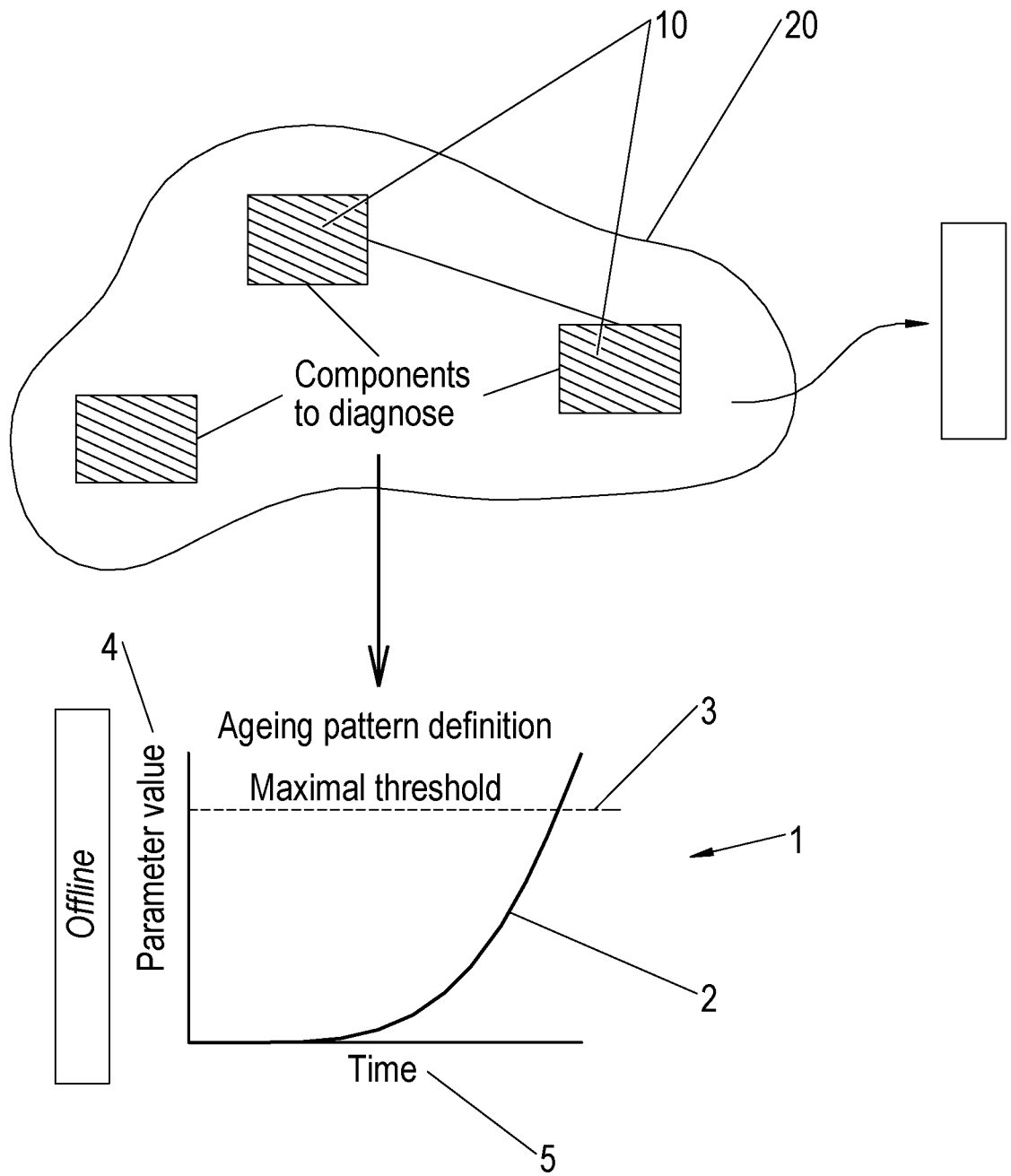
FIG. 1 A diagram showing steps to be performed for setting up an embodiment of the method of the present disclosure, FIG. 2 A flow diagram showing steps of an embodiment of the method of the present disclosure, and FIG. 3 A diagram showing an embodiment of the fitting of the aging pattern.

A more detailed description of an embodiment of the method of the present disclosure is described below with respect to FIGS. 1 to 3. The present disclosure, and in particular the embodiment described, is especially well suited to predict the remaining time of a filter before it is clogged.

1. Ageing Pattern Definition

The behaviour of the monitored component 10 over time, as described by the aging pattern, is the main input to the algorithm. FIG. 1 shows such an aging pattern 1 in the form of a curve 2 describing the dependency of a parameter value 5 of the system 20 on time 5.

If the pattern is not a priori known, it has to be determined before the implementation of the function.

The pattern can be obtained by learning from experimental data if they are available. If not, literature reviews or physical descriptions could help to define the pattern.

The algorithm does not require a full pattern description as pattern parameters are tuned during the component life. Nevertheless, it shall be possible to "inverse" the representation of the ageing pattern, i.e. to be able to find a time from any computed component condition.

In an embodiment, the pattern is defined by a mathematical expression. In alternative embodiments, the pattern is defined as a matrix, a model in the loop, etc.

If it is not possible to foresee a single pattern before the implementation of the function, it is also possible to predefine a list of typical patterns. The algorithm can then automatically select the most appropriate pattern.

Figure 2:
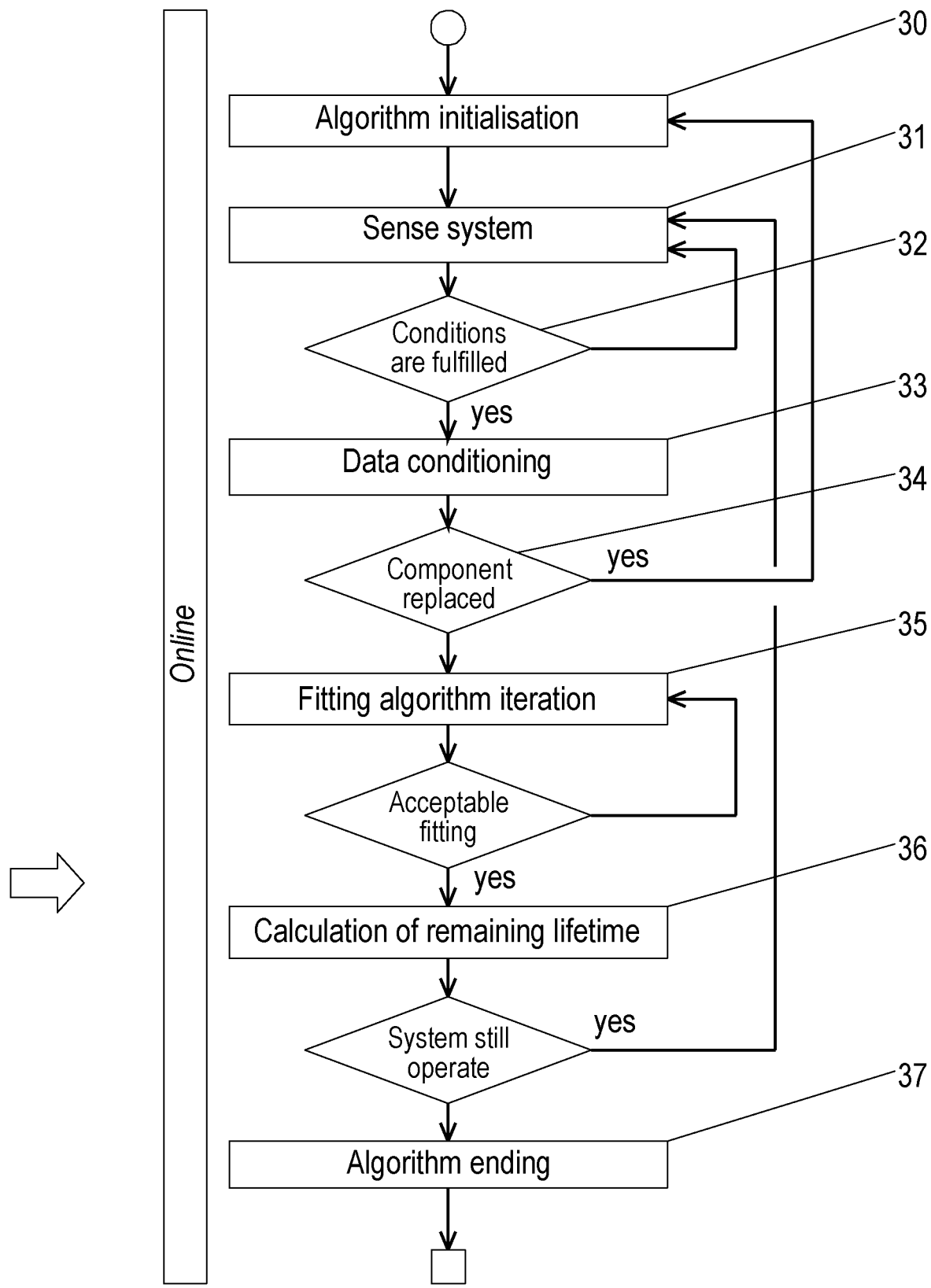

FIG. 1 therefore shows the input necessary for setting up the method, i.e. for programming a controller to perform the method. The steps performed during the runtime of the inventive method on the controller are shown in FIG. 2.

2. Algorithm Initialisation 30

In addition to the predefined ageing pattern, the algorithm needs to sense and save the history of the monitored component. It requires a minimum of points to build and consolidate the computed ageing pattern, i.e. to fit the aging pattern to the sensed data values.

Especially when it is the first time that the algorithm is running or after each replacement of the component, the algorithm need to reset its parameters. This induces a period of initialisation 30. The duration of this period is depending on the pattern but it is possible to leave this period automatically by computing the gradient of the calculated remaining time and to wait for stabilised computations.

3. Component/System Condition Measurement 31

The system is sensed in step 31, i.e. a value of at least one system parameter is determined by measurement or from control values. The sensed parameter is the parameter described by the aging pattern or related to the parameter described by the aging pattern.

When the system is in a condition that allows the measurement, or when the system is in a referenced state (stabilised points for example), which is checked in step 32, it is the most appropriate time to sense the system. Therefore, if the check provides a positive result, all the necessary points (including the time) are saved in memory.

4. Data Conditioning 33

Depending on the frequency/amplitude of oscillations contained in the measured signals, performances of the algorithm might be affected. To overcome this situation, it might be necessary to filter the data in step 33.

Moreover, it may happen that the monitored component/system is replaced, without explicitly informing the algorithm of the change. This situation is handled by monitoring in step 34 whether a sudden change of the parameter/condition of the component/system occurred (by computing the derivative of the measured data for example). If so, the algorithm has to reset to its initial state and goes back to step 30.

5. Fitting Process 35

During the fitting process 35, the algorithm has to compute the parameters of the ageing pattern. For that purpose, the algorithm minimises the error between the ageing pattern and the measurements (cost function).

Many numerical methods exists in the literature to estimate the minimum of such a cost function. The choice has to be made wisely depending on the available computation power and memory.

Some methods require iterations to find the fitted parameters. For example, the Nelder-Mead algorithm is well suited for embedded system because of its development simplicity. Non-recursive non-linear regression algorithms also works. The later converges in one iteration and does not require any initial guess.

If the algorithm fails to find parameters within the allocated time and/or accuracy (maximum number of iterations reached and/or accuracy not accepted), the algorithm could automatically switch to another type of pattern (if a list of possible pattern is a priori defined and implemented). This may happen if the pattern is not known or if the system behaviour has changed (after a failure or a hardware change for example).

Once a new pattern is found that finds parameters within the allocated time and/or accuracy, this pattern may be used as the new default pattern for the next fitting procedure.

To improve the efficiency of the method, the disclosure may implement a data selection that will allow to get faster the trend of the ageing parameter. Whenever possible, the measurement history that is used for the fit should contain different type of data values named "tail points", "middle points" and "head points".

Figure 3:
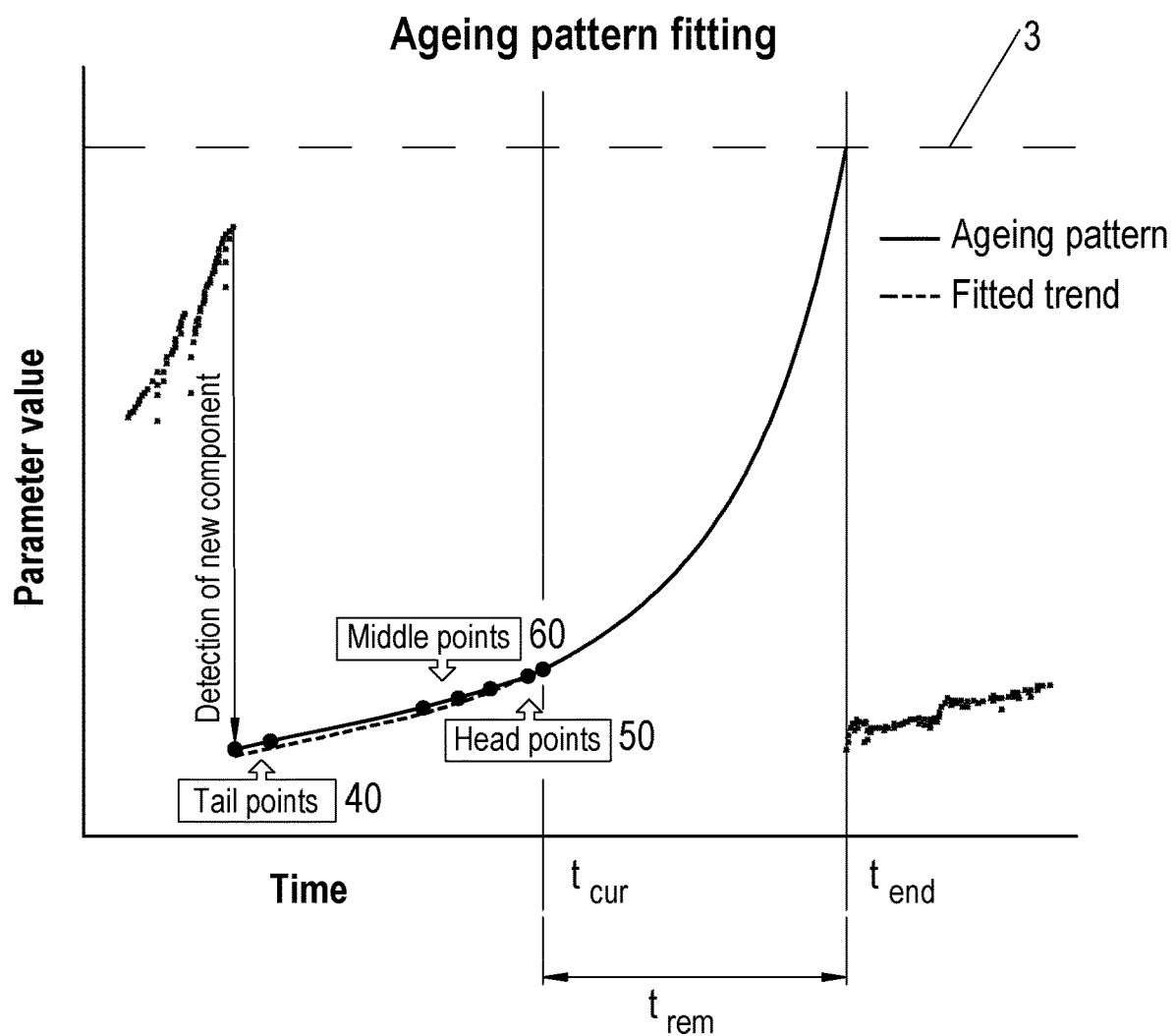

Illustration of the strategy is shown in FIG. 3 and are summarised below:

"Tail points" are first data values 40 which are measured within a relative short period of time after a new component is installed or during and/or after the initialisation of the algorithm. These points serve as an anchor for the ageing trend and are consequently not erased or replaced during the trend identification process.

"Head points" are second data values corresponding to the latest measured points and indicate the latest trend. They are especially useful when the component or the system could be differently solicited. They are stored in a "first-in first-out" memory.

"Middle points" are third data values corresponding to intermediary points in between "tail" and "head" points. They give the overall trend and are also stored in a "first-in first-out" memory.

In an embodiment, middle and head points may have different sampling rates. In particular, middle points may have a lower sampling rate (for example 1 hour) whereas head points have may have a faster sampling rate (example 10 minutes). Sampling rates have to be wisely selected depending on the component to monitor.

Further, in an embodiment, middle and tail points may have different sampling rates. In particular, middle points may have a lower sampling rate than tail points.

It is not mandatory to use all the above points, but numbers and data acquisition have to be wisely defined depending on the ageing trend.

6. Remaining Time Computation 36

As soon as new parameters are obtained from the fitting process 35, and/or at each activation of the monitoring function, the remaining time has to be updated from the inverse of the fitted model in step 36.

The end condition, which is the condition when the component has to be replaced or repaired, has to be known a priori. It could be for example a threshold 3, which has not to be exceeded, as shown in FIG. 1.

The end time $t_{end}$ corresponding to the end condition is deduced from the inverse of the fitted model, as indicated in FIG. 3. From that, the remaining time $t_{rem}$ can be predicted using the current time $t_{our}$ and the predicted end time tend.

7. Algorithm Ending 37

The algorithm ends in step 37 when the power supply is switched off. If possible, all the points, which have already been measured and stored to the memory, have to be saved in a non-volatile memory. This will avoid the requirement of a new initialisation phase and therefore significantly reduce the time required for the start-up for the next activation of the function.

The inventive method to predict a remaining lifetime of a system/component contains the following innovations:

1. The method does not have to embed big data history of many similar previous systems, as it only requires the ageing pattern.

2. If the ageing pattern is not known, the algorithm tests the most appropriate one from a predefined list of most probable or typical ageing patterns.

3. Depending on the real use of the system, the ageing pattern parameters evolve at each iteration: the trend is built based on the current condition but also using strategic key points (named tail, head, and middle points). Using the proposed key points also reduces the running time before getting the trend of the pattern.

4. The algorithm is autonomous, as it does not require any information from the user. If the monitored system/component is replaced, the algorithm detects it automatically and reset its parameters.

The method can be implemented on a controller of the system or on a separate controller receiving the sensed parameter from the controller of the system.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for predicting a remaining lifetime parameter of a component installed in an engine system, the method performed by a controller of the engine system, the method comprising:

repeatedly sensing at least one parameter of the engine system using at least one sensor to obtain a history of data values;

storing the data values sensed by the at least one sensor in a memory of the controller to obtain stored data values;

erasing a part of the stored data values from the memory to obtain a subset of the stored data values;

fitting an aging pattern to the subset of data values to obtain a fitted aging pattern by determining parameters of the aging pattern that minimize an error between the subset of data values and calculated values provided by the aging pattern; and determining the remaining lifetime parameter of the component from the fitted aging pattern by comparing the fitted aging pattern with a parameter value threshold, wherein the storing and erasing comprises:

storing first data values sensed during an initialization of the algorithm and retaining the first data values throughout a lifetime parameter determination of the component as part of the subset of data values, storing second data values from a most recent time period and using the second data values as part of the subset of data values, and erasing at least a part of third data values sensed and stored between the first data values and the second data values with time such that the subset of the data values contains only a part of the data values sensed and stored since the initialization of the algorithm.

2. The method of claim 1, wherein at least a part of the third data values are used as part of the subset of data values.

3. The method of claim 1, wherein the data are only erased when the algorithm is re-initialized.

4. The method of claim 1, wherein the aging pattern for determining the remaining lifetime parameter is automatically selected from a predefined set of different aging patterns.

5. The method of claim 4, wherein the method starts with a default aging pattern and/or automatically switches to a different aging pattern if the aging pattern does not fulfill a quality criterion.

6. A method for predicting a remaining lifetime parameter of a component installed in an engine system, the method performed by a controller of the engine system, the method comprising:

repeatedly sensing at least one parameter of the system using at least one sensor to obtain a history of data values;

fitting an aging pattern to the data values to obtain a fitted aging pattern by determining parameters of the aging pattern that minimize an error between the data values and calculated values provided by the aging pattern; and determining the remaining lifetime parameter of the component from the aging pattern by comparing the fitted aging pattern with a parameter value threshold, wherein the method further comprises:

a change of the component is automatically detected automatically detecting that the component has been replaced by a new component by evaluating the data values.

7. The method of claim 6, wherein the step of evaluating the data values comprises monitoring a change in the data values.

8. The method of claim 6, wherein the remaining lifetime parameter determination is reset when it is detected that the component has been replaced by the new component.

9. The method of claim 8, wherein the reset comprises removing data values that were obtained before it was detected that the component had been replaced by the new component from evaluation and/or resetting parameters of the aging pattern, wherein the reset comprises resetting an algorithm to an initial state and/or default values.

10. The method of claim 1, wherein during the initialization period, the determined remaining lifetime parameter is not output to a user.

11. The method of claim 1, wherein the component is a filter and the at least one parameter of the system is a pressure loss over the filter.

12. A system for predicting the remaining lifetime parameter of the component installed in the engine system, the system comprising a controller configured and programmed to determine the remaining lifetime parameter of the component using the method of claim 1.

13. The system of claim 12, the system being connected to a user interface and programmed to inform a user of a remaining lifetime of the component and/or output a servicing requirement of the component.

14. The method of claim 2, wherein the second and third data values are regularly replaced by new data values and may be saved and erased on a first in first out basis.

15. The method of claim 5, wherein the method starts with the default aging pattern and/or automatically switches to the different aging pattern if it does not provide a fit to the data values with a predefined accuracy.

16. The method of claim 7, wherein the step of evaluating the data values comprises monitoring a time derivate of the data values.

17. The method of claim 10, wherein an end of the initialization period is automatically determined by monitoring a change in the determined remaining lifetime parameter and a gradient of the determined remaining lifetime parameter, and wherein after the initialization period the determined remaining lifetime parameter is output to a user.

18. The method of claim 1, wherein the aging pattern is defined as a formula, and wherein the parameters of the aging pattern determined in the fitting step are coefficients of the formula being determined in the fitting.

* * * * *